United States Patent
Chai

(10) Patent No.: US 9,749,914 B2
(45) Date of Patent: Aug. 29, 2017

(54) HANDOVER PROCESSING METHOD AND SYSTEM, RELAY DEVICE, AND BASE STATION

(75) Inventor: Li Chai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 13/408,716

(22) Filed: Feb. 29, 2012

(65) Prior Publication Data
US 2012/0155377 A1    Jun. 21, 2012

Related U.S. Application Data

(63) Continuation of application No. PCT/CN2010/075655, filed on Aug. 3, 2010.

(30) Foreign Application Priority Data

Sep. 3, 2009   (CN) .......................... 2009 1 0092270

(51) Int. Cl.
*H04W 36/00*   (2009.01)

(52) U.S. Cl.
CPC .... *H04W 36/0083* (2013.01); *H04W 36/0016* (2013.01); *H04W 36/0055* (2013.01)

(58) Field of Classification Search
CPC ........... H04W 36/00–36/0094; H04W 84/047; H04W 92/20–92/24

(Continued)

(56) References Cited

U.S. PATENT DOCUMENTS

2005/0128969 A1   6/2005 Lee et al.
2007/0142050 A1*  6/2007 Handforth et al. ........... 455/436
(Continued)

FOREIGN PATENT DOCUMENTS

CN    1798435 A    7/2006
CN    101064555 A  10/2007
(Continued)

OTHER PUBLICATIONS

Office Action issued in corresponding Chinese Patent Application No. 200910092270.9, mailed Jun. 20, 2013, 8 pages.
(Continued)

*Primary Examiner* — Eric Myers
(74) *Attorney, Agent, or Firm* — Brinks Gilson & Lione

(57) ABSTRACT

Embodiments of the present disclosure disclose a handover processing method. The method includes: before a source Donor E-UTRAN Node B (DeNB) makes a handover decision, sending auxiliary information for obtaining a pre-configured parameter; receiving the pre-configured parameter; and performing a handover from the source DeNB to a target DeNB according to the pre-configured parameter. The relay device includes: a first sending module, configured to send, before a source DeNB makes a handover decision, auxiliary information for obtaining the pre-configured parameter; a first receiving module, configured to receive the pre-configured parameter; and a handover module, configured to perform a handover from the source DeNB to a target DeNB according to the pre-configured parameter. According to the embodiments of the present disclosure, the technical problem that the service interruption of the UE controlled by the relay device is prolonged due to a long delay in the handover operation is solved.

22 Claims, 8 Drawing Sheets

(58) Field of Classification Search
USPC ........ 370/315, 319–320, 331–335, 342, 479;
455/436–444, 11.1–13.2
See application file for complete search history.

(56) References Cited

U.S. PATENT DOCUMENTS

| | | | |
|---|---|---|---|
| 2007/0224991 | A1 | 9/2007 | Kang et al. |
| 2009/0097434 | A1 | 4/2009 | Leng et al. |
| 2010/0260097 | A1* | 10/2010 | Ulupinar et al. ............. 370/315 |
| 2011/0263271 | A1* | 10/2011 | Hoymann et al. ......... 455/456.1 |
| 2012/0002589 | A1 | 1/2012 | Saifullah et al. |
| 2012/0302243 | A1* | 11/2012 | Park et al. .................... 455/436 |

FOREIGN PATENT DOCUMENTS

| | | |
|---|---|---|
| CN | 101083835 A | 12/2007 |
| CN | 101175304 A | 5/2008 |
| CN | 101330737 A | 12/2008 |
| CN | 101365242 A | 2/2009 |
| CN | 101384068 A | 3/2009 |
| CN | 101389140 A | 3/2009 |
| CN | 101449613 A | 6/2009 |
| WO | WO 2008/084943 A1 | 7/2008 |

OTHER PUBLICATIONS

Office Action issued in corresponding Chinese Patent Application No. 200910092270.9, mailed Aug. 3, 2012.
Written Opinion of the International Searching Authority issued in corresponding PCT Patent Application No. PCT/CN2010/075655, mailed Nov. 11, 2010.
Office Action issued in corresponding Chinese Patent Application No. 200910092270.9, mailed Mar. 14, 2013.
International Search Report issued in corresponding PCT Patent Application No. PCT/CN2010/075655, mailed Nov. 11, 2010.
Author Unknown, "Analysis of Mobile Satellite Communication System's Orbit and Coverage" Part 1, China Academic Journal Electronic Publishing House, Jul. 1996.
Author Unknown, "Analysis of Mobile Satellite Communication System's Orbit and Coverage" Part 1, China Academic Journal Electronic Publishing House, Aug. 1996.

* cited by examiner

HANDOVER PROCESSING METHOD AND SYSTEM, RELAY DEVICE, AND BASE STATION

CROSS-REFERENCE TO RELATED APPLICATIONS

This application is a continuation of International Application No. PCT/CN2010/075655, filed on Aug. 3, 2010, which claims priority to Chinese Patent Application No. 200910092270.9, filed on Sep. 3, 2009, both of which are hereby incorporated by reference in their entireties.

FIELD

The embodiments of the present disclosure relate to the field of communications technologies, and in particular, to a handover processing method and system, a relay device, and a base station.

BACKGROUND

With the continuous development of mobile communication technologies, the relay technology has been applied to public transportation vehicles moving at a high speed, for example, a high-speed train, so that high quality communication services are provided for a user equipment (UE) on the public transportation vehicles.

The relay technology refers to adding one or multiple relays between an base station and a UE so that a radio signal sent by the base station may be forwarded once or multiple times until the signal reaches the UE. Taking a simple two-hop relay as an example, the relay device divides one radio link from the base station to the UE into two radio links: a radio link from the base station to the relay device, and a radio link from the relay device to the UE. In this way, one link with poor quality is replaced by two links with good quality so that a larger link capacity and wider network coverage are obtained. In a public transportation vehicle moving at a high speed, for example, a train, the UE may access the relay device installed on the train. With high-speed moving of the train, the relay device may traverse multiple cells. When the relay device traverses multiple cells, a Donor E-UTRAN Node B (DeNB) changes. Here UTRAN stands for Universal Terrestrial Radio Access Network. Therefore, the relay device is handed over between cells, and all UEs on the train are handed over in group handover mode.

The relay device introduced between the UE and base station prolongs the delay in the handover operation. Consequently, the service interruption time of the UE controlled by the relay device is prolonged, and service continuity is poor, which reduces the quality of service.

SUMMARY

Embodiments of the present disclosure provide a handover processing method and system, a relay device, and an base station to improve the quality of service.

An embodiment of the present disclosure provides a handover processing method, including: before a source Donor E-UTRAN Node B makes a handover decision, sending auxiliary information for obtaining a pre-configured parameter; receiving the pre-configured parameter; and performing a handover from the source Donor E-UTRAN Node B to a target Donor E-UTRAN Node B according to the pre-configured parameter.

An embodiment of the present disclosure provides a relay device, including: a first sending module, configured to send, before a source Donor E-UTRAN Node B makes a handover decision, auxiliary information for obtaining a pre-configured parameter; a first receiving module, configured to receive the pre-configured parameter; and a handover module, configured to perform a handover from the source Donor E-UTRAN Node B to a target Donor E-UTRAN Node B according to the pre-configured parameter.

Correspondingly, an embodiment of the present disclosure provides a handover processing system, including a relay device, a source DeNB, and a target DeNB, where: the relay device is configured to send auxiliary information for obtaining the pre-configured parameter, receive the pre-configured parameter, and perform a handover from the source Donor E-UTRAN Node B to the target Donor E-UTRAN Node B according to the pre-configured parameter; the source Donor E-UTRAN Node B is configured to make a handover decision after the relay device obtains the pre-configured parameter; and the target Donor E-UTRAN Node B is configured to receive a handover request of the relay device after the source Donor E-UTRAN Node B makes the handover decision.

The relay device provided in the above embodiment of the present disclosure may, before the source Donor E-UTRAN Node B makes the handover decision, pre-configure resources that are required for the handover of the relay device from the source Donor E-UTRAN Node B to the target Donor E-UTRAN Node B, other than configure the resources when the handover from the source Donor E-UTRAN Node B to the target Donor E-UTRAN Node B has started. Therefore, according to the above embodiment of the present disclosure, the handover delay of the relay device during a handover process is shortened, the service interruption time of the UE controlled by the relay device is reduced, the service continuity of the UE controlled by the relay device during the handover process is ensured, and the QoS is improved.

An embodiment of the present disclosure provides another handover processing method, including: receiving uplink physical information of a relay device sent by a source Donor E-UTRAN Node B; and configuring resource information for the relay device when the relay device is detected according to the uplink physical information so that the source Donor E-UTRAN Node B hands over the relay device to a target Donor E-UTRAN Node B according to the resource information.

An embodiment of the present disclosure provides an base station, including: a second receiving module, configured to receive uplink physical information of a relay device sent by a source Donor E-UTRAN Node B; and a configuring module, configured to configure resource information for the relay device when the relay device is detected according to the uplink physical information so that the source Donor E-UTRAN Node B hands over the relay device to a target Donor E-UTRAN Node B according to the resource information.

Correspondingly, an embodiment of the present disclosure provides a handover processing system, including a relay device, a source Donor E-UTRAN Node B, and a target Donor E-UTRAN Node B, where: the source Donor E-UTRAN Node B is configured to send uplink physical information of the relay device to the target Donor E-UTRAN Node B according to route track information during moving of the relay device, or according to time information; and the target Donor E-UTRAN Node B is configured to configure resource information for the relay device when the relay device is detected according to the uplink physical information so that the source Donor E-UTRAN Node B hands over the relay device to the target Donor E-UTRAN Node B according to the resource information.

According to the above embodiment of the present disclosure, the target Donor E-UTRAN Node B may pre-configure resource information for the relay device before the relay device initiates a handover, so that the relay device may use the pre-configured resource information when the relay device subsequently initiates a handover from the source Donor E-UTRAN Node B to the target Donor E-UTRAN Node B. Therefore, according to the above embodiment, the handover delay of the relay device during the handover process is shortened, the service continuity of the UE controlled by the relay device during the handover process is further ensured, and the QoS is improved.

BRIEF DESCRIPTION OF THE DRAWINGS

To make the technical solution of the present disclosure clearer, the accompanying drawings for illustrating the embodiments of the present disclosure are briefly described below. Apparently, the accompanying drawings are exemplary only, and persons skilled in the art may derive other drawings from such accompanying drawings without creative efforts.

DETAILED DESCRIPTION OF THE EMBODIMENTS

The technical solution disclosed in embodiments of the present disclosure is described clearly and completely with reference to embodiments and accompanying drawings. Evidently, the embodiments to be described are exemplary only, and the present disclosure is not limited to such embodiments. Persons skilled in the art may derive other embodiments from the embodiments given here without making creative efforts, and all such embodiments fall within the protection scope of the present disclosure.

Figure 1:
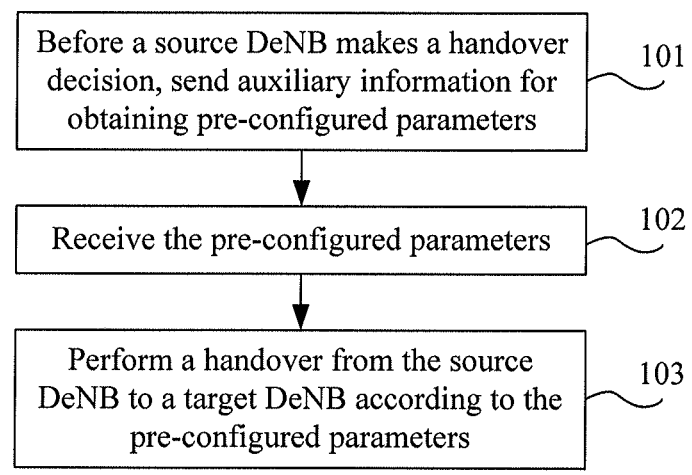
FIG. 1 is a flowchart of a handover processing method according to an embodiment of the present disclosure.

FIG. 1 is a flowchart of a handover processing method according to an embodiment of the present disclosure. As shown in FIG. 1, the method may include the following steps:

Step 101: Before a source DeNB makes a handover decision, send auxiliary information for obtaining a pre-configured parameter.

Step 102: Receive the pre-configured parameter.

Step 103: Perform a handover from the source DeNB to a target DeNB according to the pre-configured parameter.

For example, the relay device may obtain the pre-configured parameter for the handover of the relay device from the source DeNB to the target DeNB before the source DeNB makes the handover decision. After the pre-configured parameter are obtained, the relay device may perform the handover from the source DeNB to the target DeNB according to the pre-configured parameter.

In the handover processing method according to another embodiment of the present disclosure, in step 101, the sending the auxiliary information for obtaining the pre-configured parameter before the source DeNB makes the handover decision may include:

sending the auxiliary information when it is determining that the distance between the relay device and the target DeNB is shorter than a preset distance, or that a preset time point is reached, or that a preset location is reached, before the source DeNB makes a handover decision.

During moving of the relay device, the route track of the relay device and the time point when the train arrives at a specific place are fixed. Therefore, the route track during moving of the relay device, the time point when the train arrives at a specific place, or history information of the handover of the relay device is regarded as a trigger condition for obtaining the pre-configured parameter, so as to ensure that the pre-configuration for the handover is completed before the relay device is handed over from the source DeNB to the target DeNB. For example, when the distance between the current location of the relay device and the target DeNB is shorter than a preset distance, the relay device may be triggered to obtain the pre-configured parameter; during moving of the relay device, when a preset time point is reached, the relay device may also be triggered to obtain the pre-configured parameter; and when the relay device arrives at a preset location, the relay device may also be triggered to obtain the pre-configured parameter.

This embodiment uses the relay device applied on the train as an example for illustration.

In the prior art, when the train traverses multiple cells at a high speed, the relay device on the train may be handed over due to the change of the DeNB. In addition, UEs on the train may be handed over in group handover mode. Therefore, within a short period of time, a large amount of air interface signaling is generated during moving of the relay device. In addition, resources are reconfigured for the handover of a large number of UEs controlled by the relay device. The source DeNB may not process such air interface signaling within a short period of time. Consequently, the UEs corresponding to the air interface signaling that fail to be processed, move away from the source DeNB before being handed over to the target DeNB. In this case, service interruption occurs because the UEs do not access any cell; even if the UEs have sufficient time to complete the handover procedure, connection reconfiguration for the access link and relay link may cause a long time of service interruption and thus affect service continuity.

In this embodiment, because of the relay device on the train, the route track during moving of the relay device and the time point when the train arrives at a specific place are fixed. Therefore, according to this embodiment, before the source DeNB makes the handover decision, the relay device may pre-configure resources that are required for the handover of the relay device from the source DeNB to the target DeNB. In this case, before the handover from the source DeNB to the target DeNB needs to be executed, the relay device makes a good preparation for the handover; and during the handover, the relay device may be handed over from the source DeNB to the target DeNB according to pre-configured resources, without the need of configuring the resources when the relay device is started to be handed over from the source DeNB to the target DeNB. Therefore, the handover processing method according to this embodiment shortens the handover delay of the relay device during the handover process, shortens the service interruption time of the UE controlled by the relay device, ensures the service continuity of the UE controlled by the relay device during the handover process, and improves the QoS.

In the handover processing method according to still another embodiment of the present disclosure, after step 101, the method may further include:

sending pre-configuration information to a UE according to the pre-configured parameter so that the UE configures the parameter according to the pre-configuration information.

After obtaining the pre-configured parameter, the relay device may send pre-configuration information to the UE controlled by the relay device, in which the UE requires the pre-configuration information for configuring the parameter. The pre-configuration information may be all or part of the pre-configured parameter so that the UE may make a good preparation for parameter configuration before parameter reconfiguration. In this way, the UE, under the control of the relay device, configures the parameter according to the pre-configuration information, without the need of configuring the resources when the relay device is started to be handed over from the source DeNB to the target DeNB.

In the handover processing method according to still another embodiment of the present disclosure, the pre-configured parameter may include at least one of target cell frequency information, target cell bandwidth information, a tracking area identity (Trace Area Identity, TAI), multicast broadcast single frequency network (Multicast Broadcast Single Frequency Network, MBSFN) subframe configuration information of a target cell, Physical Cell Identity (PCI) information of the target cell, and public land mobile network (Public Land Mobile Network, PLMN) identifier information. The auxiliary information may include at least one kind of parameter of current location information, current speed information, a current time point information, current frequency information, PCI information, and history record information.

It should be noted that the above pre-configured parameter and auxiliary information are not limited to the parameter listed above. Those skilled in the art may understand that the pre-configured parameter and auxiliary information may be selected according to an actual requirement.

For example, the relay device may report at least one kind of parameter of a current location information, current speed information, current time point information, current frequency information, PCI information, and history record information of the relay device, when the distance between the relay device and the target DeNB is shorter than a preset distance. And then a corresponding pre-configured parameter may be obtained according to the auxiliary information. The pre-configured parameter may include at least one of target cell frequency information, target cell bandwidth information, a TAI, MBSFN of a target cell, PCI information of the target cell, and PLMN identifier information. In this way, the relay device performs pre-configuration for the handover according to the target cell frequency information, the target cell bandwidth information, the TAI, the MBSFN subframe configuration information of the target cell, the PCI information of the target cell, and the PLMN identifier information, so as to facilitate the subsequent handover from the source DeNB to the target DeNB.

During the implementation of the above embodiment, a corresponding configured parameter set may be generated in advance for the relay device according to the actual network planning and deployment of the DeNB. The parameter set may be saved in the operation and maintenance (Operation and Maintenance, O&M) system of the relay device, the O&M system of the source DeNB, the O&M system of the target DeNB, or a mobility management entity (MME). In addition, the pre-configured parameter in the configured parameter set may also be updated when configuration of the current network changes.

The handover processing method according to the present disclosure is described in detail with reference to four exemplary embodiments.

Figure 2:
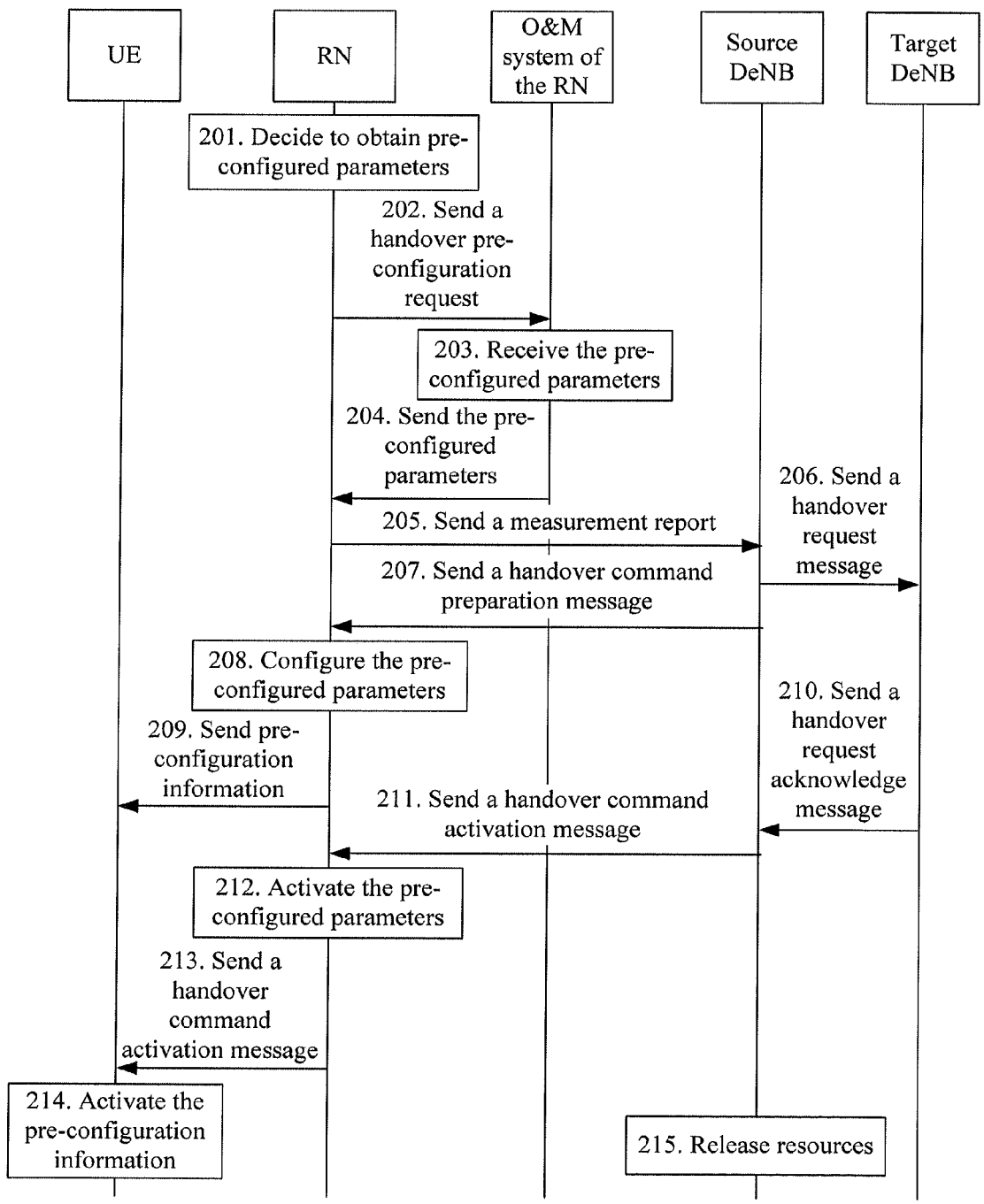
FIG. 2 is a signaling flowchart of a handover processing method according to another embodiment of the present disclosure.

FIG. 2 is a signaling flowchart of a handover processing method according to another embodiment of the present disclosure. In this embodiment, a pre-configured parameter set may be saved in an O&M system of a relay device. Correspondingly, as shown in FIG. 1, the sending the auxiliary information in step 101 may include: sending, by the relay device, a handover pre-configuration request carrying the auxiliary information to an O&M system of the relay device. The receiving the pre-configured parameter in step 102 may include: receiving, by the relay device, the pre-configured parameter obtained from a configured parameter set according to the auxiliary information and sent by the O&M system of the relay device. The performing the handover from the source DeNB to the target DeNB according to the pre-configured parameter in step 103 may include: sending, by the relay device, a measurement report carrying the pre-configured parameter to the source DeNB so that the source DeNB sends a handover request message carrying the pre-configured parameter to the target DeNB and sends a handover command preparation message to the relay device, and after receiving a handover request acknowledge message fed back by the target DeNB, sends a handover command activation message to the relay device; and configuring, by the relay device, the pre-configured parameter according to the handover command preparation message, activating the pre-configured parameter after receiving the handover command activation message, and performing the handover from the source DeNB to the target DeNB.

Specifically, as shown in FIG. 2, the method according to this embodiment may include the following steps:

Step 201: During moving, the relay device decides to obtain the pre-configured parameter of a next DeNB.

For example, the relay device, during moving, decides to obtain the pre-configured parameter of a next DeNB when the distance between the relay device and the target DeNB is shorter than a preset distance, or when a preset time point is reached, or when a preset location is reached.

Step 202: The relay device sends a handover pre-configuration request to the O&M system of the relay device.

The handover pre-configuration request may carry auxiliary information. The auxiliary information may be at least one kind of parameter of current location information, current speed information, current time point information, current frequency information, PCI information, and history record information of the relay device.

Step 203: The O&M system of the relay device obtains the pre-configured parameter from a configured parameter set.

For example, the O&M system of the relay device may select the pre-configured parameter from a saved configured parameter set according to the auxiliary information sent by the relay device. The pre-configured parameter includes at least one of target cell frequency information, target cell bandwidth information, a TAI, MBSFN of a target cell, PCI information of the target cell and PLMN identifier information.

Step 204: The O&M system of the relay device sends the pre-configured parameter to the relay device.

For example, the O&M system of the relay device may either send the pre-configured parameter to the relay device by using a serial number, or explicitly send the pre-configured parameter to the relay device.

Step 205: The relay device sends a measurement report to a source DeNB.

The measurement report may carry the pre-configured parameter obtained by the relay device, to sent the information to the source DeNB.

Step 206: After making a handover decision, the source DeNB sends a handover request message to a target DeNB.

The handover request message carries pre-configuration information to send the information to the target DeNB.

Step 207: The source DeNB sends a handover command preparation message to the relay device.

It should be noted that step 206 and step 207 are not limited to the above sequence.

Step 208: After receiving the handover command preparation message, the relay device configures the pre-configured parameter.

In this embodiment, after the relay device configures the pre-configured parameter, the configured parameter may not be activated. At this time, the relay device saves two sets of parameter, i.e., the parameter before the handover and the parameter after the handover.

Step 209: The relay device sends the pre-configuration information to a UE.

The relay device may send the pre-configuration information to the UE according to the parameter which are after pre-configuration for the handover, so that the UE configures the parameter after the handover according to the pre-configuration information, but does not activate the configured parameter.

Step 210: After receiving the handover request message and performing admission control, the target DeNB returns a handover request acknowledge message to the source DeNB.

Step 211: After receiving the handover request acknowledge message, the source DeNB sends a handover command activation message to the relay device.

Step 212: After receiving the handover command activation message, the relay device activates the pre-configured parameter.

Step 213: The relay device sends a handover command activation message to the UE.

Step 214: After receiving the handover command activation message, the UE activates the pre-configuration information.

Step 215: The source DeNB releases resources, and the handover procedure ends.

According to this embodiment, before the source DeNB makes the handover decision, the relay device may pre-configure resources that are required for the handover of the relay device from the source DeNB to the target DeNB. In this case, before the handover from the source DeNB to the target DeNB needs to be executed, the relay device makes a good preparation for the handover; and during the handover, the relay device may be handed over from the source DeNB to the target DeNB according to the pre-configured resources, without the need of configuring the resources when the relay device is being handed over from the source DeNB to the target DeNB. In addition, the relay device may send the pre-configuration information to the UE before the source DeNB makes the handover decision so that the UE reconfigures the parameter before the handover of the relay device. This also prevents the service interruption of the UE during the handover of the relay device. Therefore, the handover processing method according to this embodiment shortens the handover delay of the relay device during the handover process, reduces the service interruption time of the UE controlled by the relay device, ensures the service continuity of the UE controlled by the relay device during the handover process, and improves the QoS. In addition, before the relay device is handed over from the source DeNB to the target DeNB, the source DeNB and the target DeNB may obtain the pre-configured parameter, so that the source DeNB and the target DeNB do not need to configure the resources again during the handover of the relay device. In this way, the service continuity is further ensured, and the QoS is improved.

Figure 3:
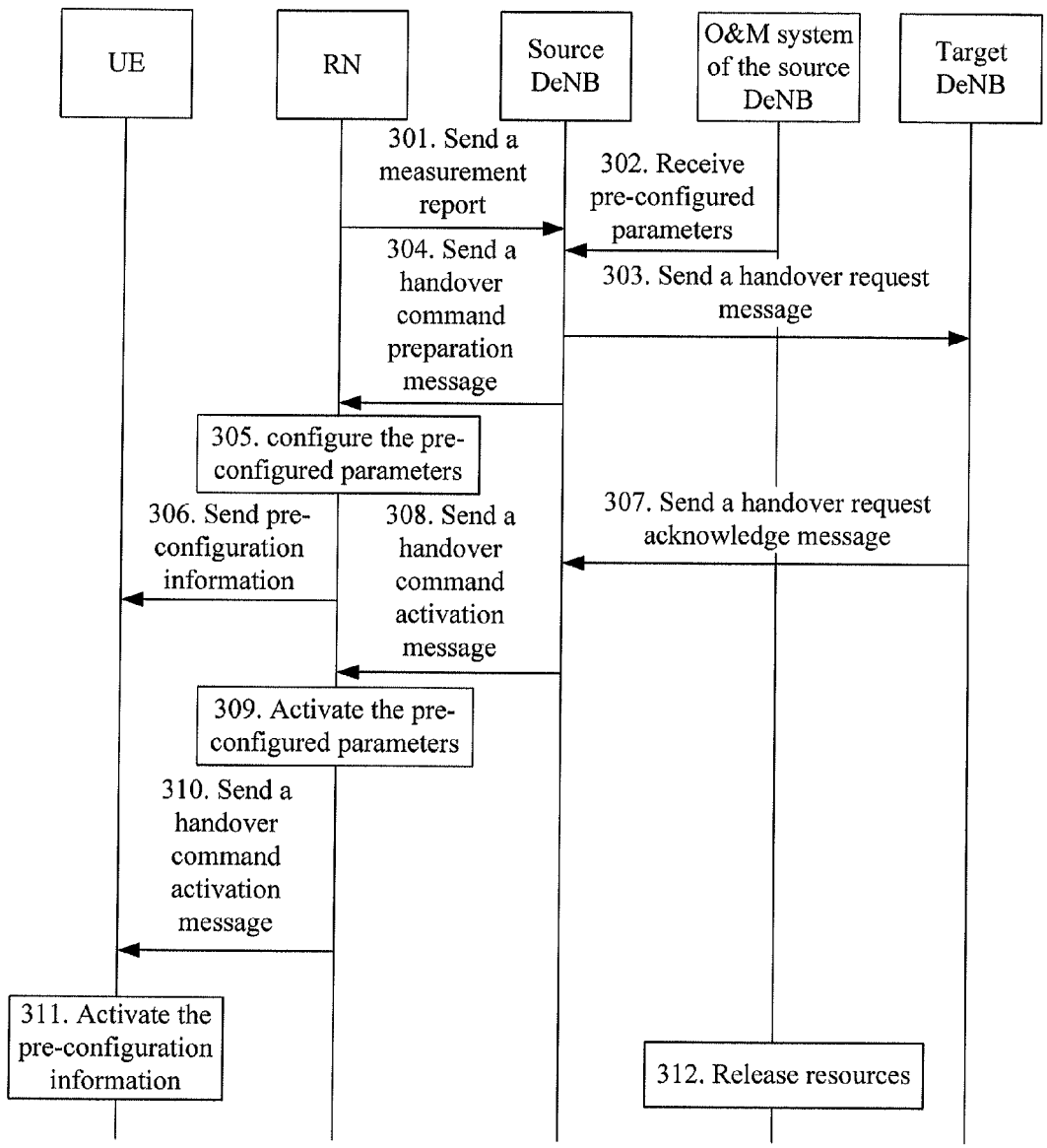
FIG. 3 is a signaling flowchart of a handover processing method according to still another embodiment of the present disclosure.

FIG. 3 is a signaling flowchart of a handover processing method according to still another embodiment of the present disclosure. In this embodiment, a pre-configured parameter set may be saved in an O&M system of the source DeNB. Correspondingly, as shown in FIG. 1, the sending the auxiliary information in step 101 may include: sending, by a relay device, a measurement report or dedicated signaling message carrying the auxiliary information to the source DeNB. The receiving the pre-configured parameter in step 102 may include: receiving, by the relay device, a handover command preparation message carrying the pre-configured parameter that is sent by the source DeNB, after the source DeNB obtains the pre-configured parameter from a configured parameter set of the O&M system of the source DeNB according to the auxiliary information. The performing the handover from the source DeNB to the target DeNB according to the pre-configured parameter in step 103 may include: sending, by the source DeNB, a handover command activation message to the relay device after the source DeNB sends a handover request message carrying the pre-configured parameter to the target DeNB and receives the handover request acknowledge message fed back by the target DeNB; and activating, by the relay device, the pre-configured parameter according to the handover command activation message, and performing the handover from the source DeNB to the target DeNB.

Specifically, as shown in FIG. 3, the method according to this embodiment may include the following steps:

Step 301: A relay device sends a measurement report to a source DeNB.

The measurement report may carry auxiliary information. The auxiliary information may be: at least one kind of parameter of current location information, current speed information, current time point information, current frequency information, PCI information, and history record information of the relay device.

Alternatively, in the handover processing method according to another embodiment of the present disclosure, before sending a measurement report, the relay device may also send a dedicated signaling message between the relay device and the source DeNB to the source DeNB. The dedicated signaling message carries the auxiliary information.

The trigger condition of sending the measurement report or the dedicated signaling message by the relay device may be also the location information or time information described in the above embodiment, which is not detailed here.

Step 302: The source DeNB obtains the pre-configured parameter from a configured parameter set saved in the O&M system of the source DeNB.

For example, the O&M system of the source DeNB may select the pre-configured parameter from the saved configured parameter set according to the auxiliary information. The pre-configured parameter includes at least one of target cell frequency information, target cell bandwidth information, a TAI, MBSFN of a target cell, PCI information of the target cell, and PLMN identifier information. The O&M system of the source DeNB may either send the pre-configured parameter to the source DeNB by using a serial number, or explicitly send the pre-configured parameter to the source DeNB.

Step 303: After making a handover decision, the source DeNB sends a handover request message to a target DeNB.

The handover request message carries pre-configuration information to send the information to the target DeNB.

Step 304: The source DeNB sends a handover command preparation message to the relay device.

The handover command preparation message may carry pre-configuration information so as to send the information to the relay device.

It should be noted that step 303 and step 304 are not limited to the above sequence.

Step 305: After receiving the handover command preparation message, the relay device configures the pre-configured parameter.

In this embodiment, after the relay device configures the pre-configured parameter, the configured parameter may not be activated. At this time, the relay device saves two sets of parameter, i.e., the parameter before the handover and the parameter after the handover.

Step 306: The relay device sends the pre-configuration information to a UE.

The relay device may send the pre-configuration information to the UE according to the parameter which are after pre-configuration for the handover, so that the UE configures the parameter after the handover according to the pre-configuration information, but does not activate the configured parameter.

Step 307: After receiving the handover request message and performing admission control, the target DeNB returns a handover request acknowledge message to the source DeNB.

Step 308: After receiving the handover request acknowledge message, the source DeNB sends a handover command activation message to the relay device.

Step 309: After receiving the handover command activation message, the relay device activates the pre-configured parameter.

Step 310: The relay device sends a handover command activation message to the UE.

Step 311: After receiving the handover command activation message, the UE activates the pre-configuration information.

Step 312: The source DeNB releases resources, and the handover procedure ends.

According to this embodiment, before the source DeNB makes the handover decision, the relay device may pre-configure resources that are required for the handover of the relay device from the source DeNB to the target DeNB. In this case, before the handover from the source DeNB to the target DeNB needs to be executed, the relay device makes a good preparation for the handover; and during the handover, the relay device may be handed over from the source DeNB to the target DeNB according to the pre-configured resources, without the need of configuring the resources when the relay device is being handed over from the source DeNB to the target DeNB. In addition, the relay device may send the pre-configuration information to the UE before the source DeNB makes the handover decision so that the UE reconfigures the parameter before the handover of the relay device. This also prevents the service interruption of the UE during the handover of the relay device. Therefore, the handover processing method according to this embodiment shortens the handover delay of the relay device during the handover process, reduces the service interruption time of the UE controlled by the relay device, ensures the service continuity of the UE controlled by the relay device during the handover process, and improves the QoS. In addition, before the relay device is handed over from the source DeNB to the target DeNB, the source DeNB and the target DeNB may obtain the pre-configured parameter, so that the source DeNB and the target DeNB do not need to configure the resources again during the handover of the relay device. In this way, the service continuity is further ensured, and the QoS is improved.

Figure 4:
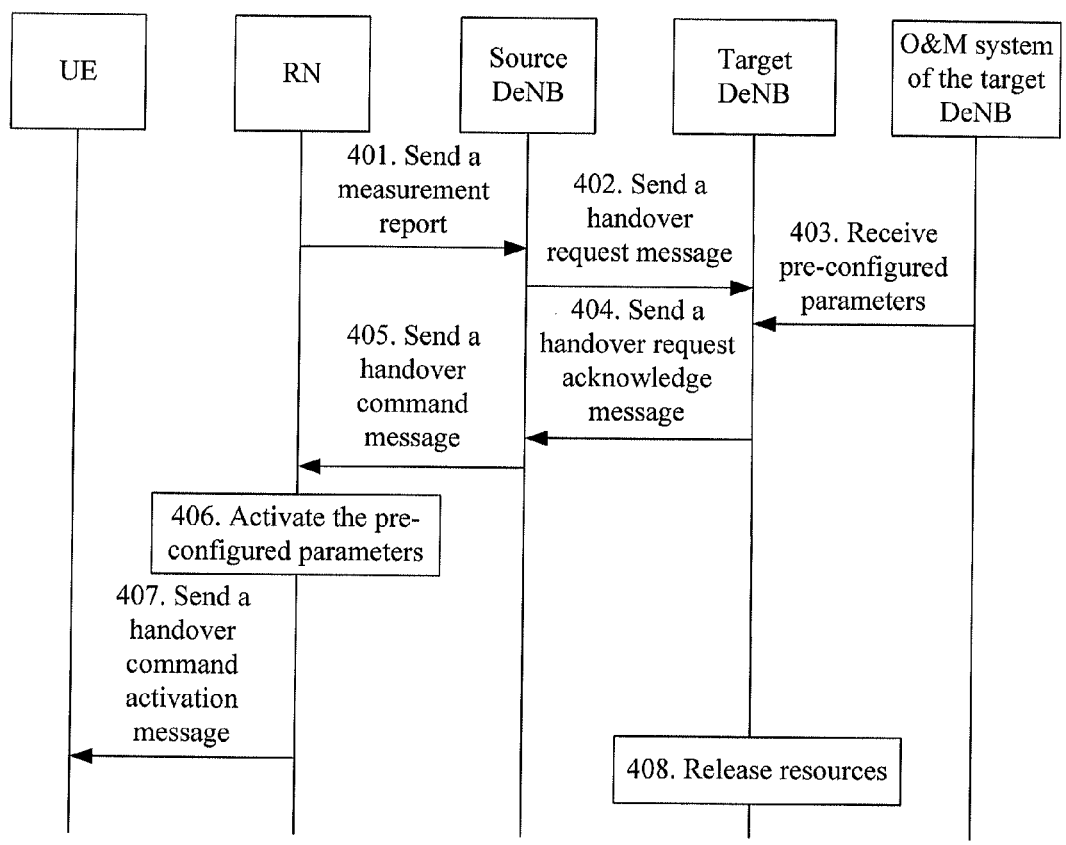
FIG. 4 is a signaling flowchart of a handover processing method according to still another embodiment of the present disclosure.

FIG. 4 is a signaling flowchart of a handover processing method according to still another embodiment of the present disclosure. In this embodiment, a pre-configured parameter set may be saved in an O&M system of a target DeNB. Correspondingly, as shown in FIG. 1, the sending the auxiliary information in step 101 may include: sending, by a relay device, a measurement report or dedicated signaling message carrying the auxiliary information to the source DeNB; and sending, by the source DeNB, a handover request message carrying the auxiliary information to the target DeNB. The receiving the pre-configured parameter in step 102 may include: receiving, by the relay device, the handover command message carrying the pre-configured parameter that is sent by the source DeNB, after that the source DeNB sends the handover request message carrying the auxiliary information to the target DeNB, and that the target DeNB obtains the pre-configured parameter from a configured parameter set of the O&M system of the target DeNB according to the auxiliary information and sends a handover request acknowledge message carrying the pre-configured parameter to the source DeNB. The performing the handover from the source DeNB to the target DeNB according to the pre-configured parameter in step 103 may include: activating, by the relay device, the pre-configured parameter, and performing the handover from the source DeNB to the target DeNB.

Specifically, as shown in FIG. 4, the method according to this embodiment may include the following steps:

Step 401: A relay device sends a measurement report to a source DeNB.

The measurement report may carry auxiliary information. The auxiliary information may be at least one kind of parameter of current location information, current speed information, current time point information, current frequency information, PCI information, and history record information of the relay device.

Alternatively, before sending a measurement report, the relay device may also send a dedicated signaling message between the relay device and the source DeNB to the source DeNB. The dedicated signaling message carries the auxiliary information.

The trigger condition of sending the measurement report or the dedicated signaling message by the relay device may be also the location information or time information described in the above embodiment, which is not detailed here.

Step 402: After making a handover decision, the source DeNB sends a handover request message to a target DeNB.

The handover request message carries pre-configuration information to send the information to the target DeNB.

Step 403: The target DeNB obtains the pre-configured parameter from a configured parameter set saved in the O&M system of the target DeNB.

For example, the O&M system of the target DeNB may select the pre-configured parameter from the saved configured parameter set according to the auxiliary information. The pre-configured parameter includes at least one of target cell frequency information, target cell bandwidth information, TAI information, MBSFN of a target cell, PCI information of the target cell, and PLMN identifier information.

Step 404: After performing admission control, the target DeNB sends a handover request acknowledge message to the source DeNB.

The handover request acknowledge message carries the pre-configured parameter. For example, target DeNB may either send the pre-configured parameter to the relay device by using a serial number, or explicitly send the pre-configured parameter to the source DeNB.

Step 405: The source DeNB sends a handover command message to the relay device.

The handover command message carries pre-configuration information to send the information to the relay device.

Step 406: After receiving the handover command message, the relay device activates the pre-configured parameter.

Step 407: The relay device sends a handover command activation message to the UE.

The handover command activation message carries pre-configuration information to send the information to the UE so that he UE activates the pre-configuration information.

Step 408: The source DeNB releases resources, and the handover procedure ends.

According to this embodiment, before the source DeNB makes the handover decision, the relay device may pre-configure resources that are required for the handover of the relay device from the source DeNB to the target DeNB. In this case, before the handover from the source DeNB to the target DeNB needs to be executed, the relay device makes a good preparation for the handover; and during the handover, the relay device may be handed over from the source DeNB to the target DeNB according to the pre-configured resources, without the need of configuring the resources when the relay device is being handed over from the source DeNB to the target DeNB. In addition, the relay device may send the pre-configuration information to the UE before the source DeNB makes the handover decision so that the UE reconfigures the parameter before the handover of the relay device. This also prevents the service interruption of the UE during the handover of the relay device. Therefore, the handover processing method according to this embodiment shortens the handover delay of the relay device during the handover process, reduces the service interruption time of the UE controlled by the relay device, ensures the service continuity of the UE controlled by the relay device during the handover process, and improves the QoS. In addition, before the relay device is handed over from the source DeNB to the target DeNB, the source DeNB and the target DeNB may obtain the pre-configured parameter, so that the source DeNB and the target DeNB do not need to configure the resources again during the handover of the relay device. In this way, the service continuity is further ensured, and the QoS is improved.

Figure 5:
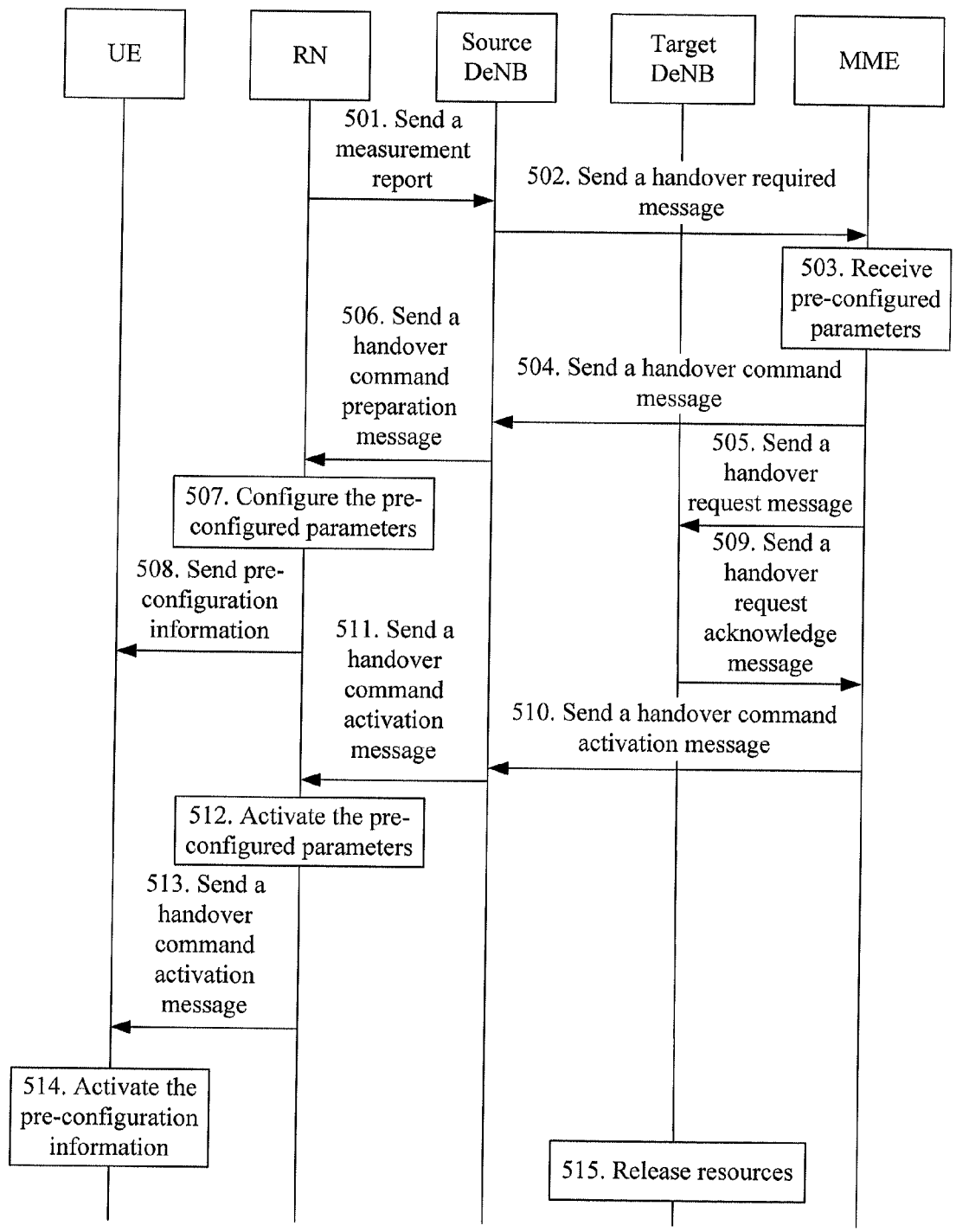
FIG. 5 is a signaling flowchart of a handover processing method according to still another embodiment of the present disclosure.

FIG. 5 is a signaling flowchart of a handover processing method according to still another embodiment of the present disclosure. In this embodiment, a pre-configured parameter set may be saved an MME. Correspondingly, as shown in FIG. 1, the sending the auxiliary information in step 101 may include: sending, by a relay device, a measurement report or dedicated signaling message carrying the auxiliary information to the source DeNB. The receiving the pre-configured parameter in step 102 may include: receiving, by the relay device, a handover command preparation message carrying the pre-configured parameter that is sent by the source DeNB, after that the source DeNB sends a handover required message carrying the auxiliary information to the MME, and that the MME obtains the pre-configured parameter from a configured parameter set, sends a handover command message carrying the pre-configured parameter to the source DeNB, and sends a handover request message carrying the pre-configured parameter to the target DeNB. The performing the handover from the source DeNB to the target DeNB according to the pre-configured parameter in step 103 may include: sending, by the target DeNB, a handover request acknowledge message to the MME after the target DeNB receives the handover request message carrying the pre-configured parameter; sending, by the MME, a handover command activation message to the source DeNB; sending, by the source DeNB, a handover command activation message to the relay device; and activating, by the relay device, the pre-configured parameter according to the handover command activation message, and performing the handover from the source DeNB to the target DeNB.

Specifically, as shown in FIG. 5, the method according to this embodiment may include the following steps:

Step 501: A relay device sends a measurement report to a source DeNB.

The measurement report may carry auxiliary information. The auxiliary information may be at least one kind of parameter of current location information, current speed information, current time point information, current frequency information, PCI information, and history record information of the relay device.

Alternatively, before sending a measurement report, the relay device may also send a dedicated signaling message between the relay device and the source DeNB to the source DeNB. The dedicated signaling message carries the auxiliary information.

The trigger condition of sending the measurement report or the dedicated signaling message by the relay device may be also the location information or time information described in the above embodiment, which is not detailed here.

Step 502: After making a handover decision, the source DeNB sends a handover required message to an MME.

The handover required message carries pre-configuration information to send the information to the MME.

Step 503: The MME obtains the pre-configured parameter from a configured parameter set.

The MME may select the pre-configured parameter from the saved configured parameter set according to the auxiliary information. The pre-configured parameter includes at least one of target cell frequency information, target cell bandwidth information, a TAI, MBSFN of a target cell, PCI information of the target cell, and PLMN identifier information.

Step 504: The MME sends a handover command message to the source DeNB.

The handover command message may carry the pre-configured parameter.

Step 505: The MME sends a handover request message to the target DeNB.

The handover request message may carry the pre-configured parameter.

In step 504 and step 505, the MME may either send the pre-configured parameter to the source DeNB and the target DeNB by using a serial number, or explicitly send the pre-configured parameter to the source DeNB and the target DeNB.

Step 506: The source DeNB sends a handover command preparation message to the relay device.

The handover command preparation message carries pre-configuration information to send the information to the relay device.

Step 507: After receiving the handover command preparation message, the relay device configures the pre-configured parameter.

In this embodiment, after the relay device configures the pre-configured parameter, the configured parameter may not be activated. At this time, the relay device saves two sets of parameter, i.e., the parameter before the handover and the parameter after the handover.

Step 508: The relay device sends the pre-configuration information to a UE.

The relay device may send the pre-configuration information to the UE according to the parameter which are after pre-configuration for the handover, so that the UE configures the parameter after the handover according to the pre-configuration information, but does not activate the configured parameter.

Step 509: After performing admission control, the target DeNB sends a handover request acknowledge message to the MME.

Step 510: The MME sends a handover command activation message to the source DeNB.

Step 511: The source DeNB sends a handover command activation message to the relay device.

Step 512: The relay device activates the pre-configured parameter.

Step 513: The relay device sends a handover command activation message to the UE.

Step 514: The UE activates the pre-configuration information.

Step 515: The source DeNB releases resources, and the handover procedure ends.

According to this embodiment, before the source DeNB makes the handover decision, the relay device may pre-configure resources that are required for the handover of the relay device from the source DeNB to the target DeNB. In this case, before the handover from the source DeNB to the target DeNB needs to be executed, the relay device makes a good preparation for the handover; and during the handover, the relay device may be handed over from the source DeNB to the target DeNB according to the pre-configured resources, without the need of configuring the resources when the relay device is being handed over from the source DeNB to the target DeNB. In addition, the relay device may send the pre-configuration information to the UE before the source DeNB makes the handover decision so that the UE reconfigures the parameter before the handover of the relay device. This also prevents the service interruption of the UE during the handover of the relay device. Therefore, the handover processing method according to this embodiment shortens the handover delay of the relay device during the handover process, reduces the service interruption time of the UE controlled by the relay device, ensures the service continuity of the UE controlled by the relay device during the handover process, and improves the QoS. In addition, before the relay device is handed over from the source DeNB to the target DeNB, the source DeNB and the target DeNB may obtain the pre-configured parameter, so that the source DeNB and the target DeNB do not need to configure the resources again during the handover of the relay device. In this way, the service continuity is further ensured, and the QoS is improved.

Figure 6:
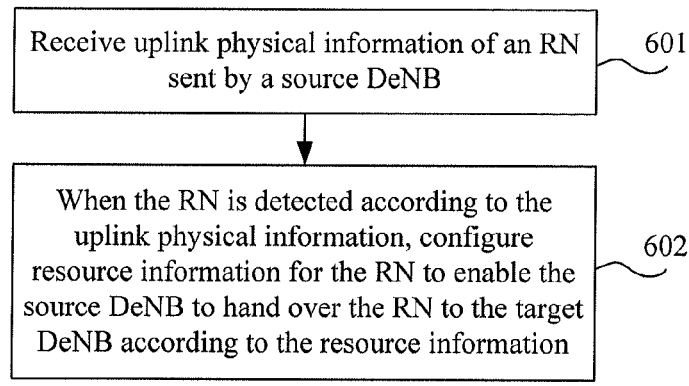
FIG. 6 is a flowchart of a handover processing method according to still another embodiment of the present disclosure.

FIG. 6 is a flowchart of a handover processing method according to still another embodiment of the present disclosure. As shown in FIG. 6, the method may include the following steps:

Step 601: Receive uplink physical information of a relay device sent by a source DeNB.

For example, a target DeNB may receive the uplink physical information of the relay device sent by the source DeNB.

In the handover processing method according to still another embodiment of the present disclosure, in step 601, the receiving the uplink physical information of the relay device sent by the source DeNB may include: receiving the uplink physical information that is sent by the source DeNB according to route track information of the relay device or time information.

The route track of the relay device and the time point when the train arrives at a specific place are fixed. Therefore, during moving of the relay device, the source DeNB may determine, according to the route track of the relay device, the time point information, or the history information of the relay device, a next target DeNB to which the relay device is to be handed over, and notifies the next target DeNB to which the relay device needs to be handed over of the uplink physical information used for the relay device to access the source DeNB, when the preset trigger condition is satisfied, i.e., a preset time point is reached.

Step 602: When the relay device is detected according to the uplink physical information, configure resource information for the relay device so that the source DeNB hands over the relay device to the target DeNB according to the resource information.

After obtaining the uplink physical information of the relay device, the target DeNB may demodulate and decode uplink signals of the relay device according to the uplink physical information, so that it can be detected whether the relay device moves to the coverage of the target DeNB. When detecting that the relay device moves to the coverage of the target DeNB, the target DeNB configures the resource information for the relay device so that the relay device uses the pre-configured resource information when the relay device is subsequently handed over from the source DeNB to the target DeNB. This prevents the service interruption that occurs because the target DeNB does not allocate the resource information until knowing that the relay device needs to be handed over. Therefore, the handover processing method according to this embodiment shortens the handover delay of the relay device during the handover process, further ensures the service continuity of the UE controlled by the relay device during the handover process, and improves the QoS.

In the handover processing method according to still another embodiment of the present disclosure, in step 602, the handing over the relay device to the target DeNB by the source DeNB according to the resource information may include: receiving, by the source DeNB, a measurement report sent by the relay device, and sending a handover request message to the target DeNB; sending, by the target DeNB, a handover request acknowledge message carrying the resource information to the source DeNB; and sending, by the source DeNB, a handover command message carrying the resource information to the relay device, and handing over the relay device to the target DeNB. In addition, the method according to this embodiment may further include: sending, by the relay device, a handover command message to a UE controlled by the relay device, and handing over the UE from the source DeNB to the target DeNB.

The handover processing method according to the present disclosure is described in detail with reference to a specific embodiment.

Figure 7:
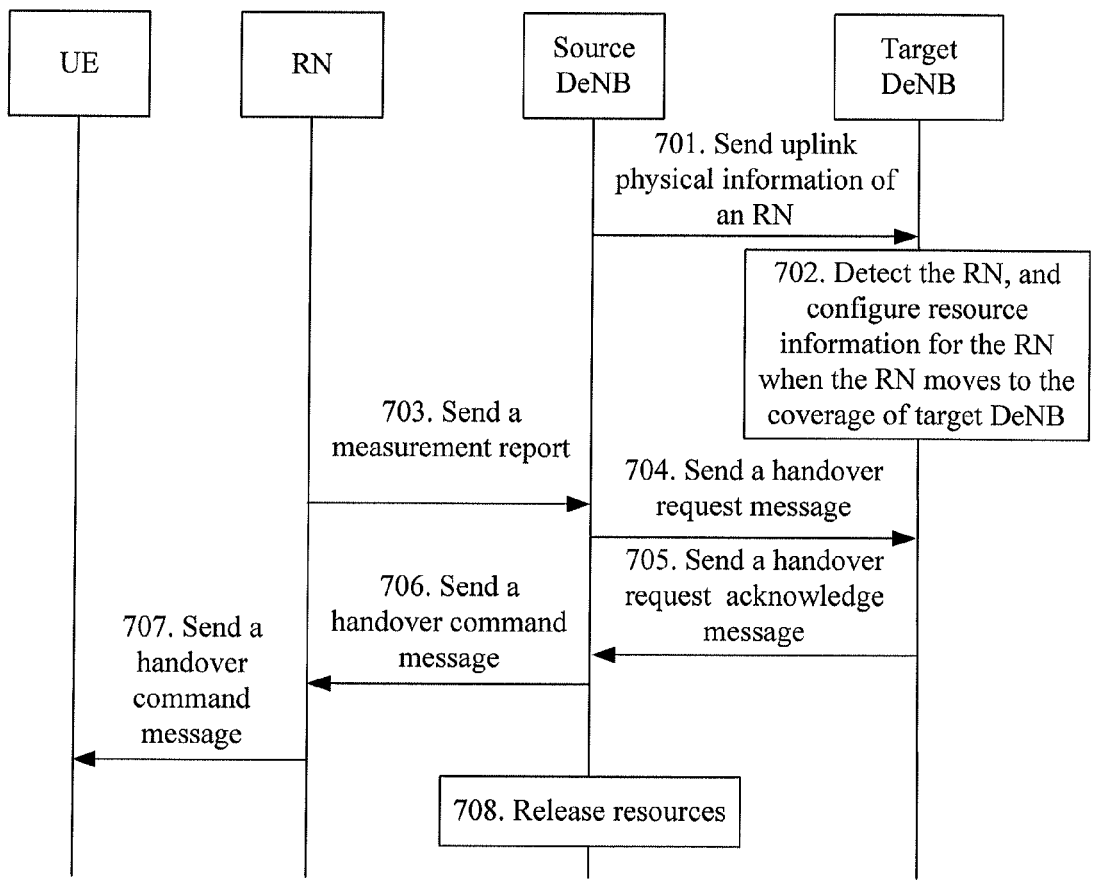
FIG. 7 is a signaling flowchart of a handover processing method according to still another embodiment of the present disclosure.

FIG. 7 is a signaling flowchart of a handover processing method according to still another embodiment of the present disclosure. As shown in FIG. 7, the method may include the following steps:

Step 701: A source DeNB sends uplink physical information of a relay device to a target DeNB.

The route track of the relay device and the time point when the train arrives at a specific place are fixed. Therefore, during moving of the relay device, the source DeNB may determine, according to the route track of the relay device, the time point information, or history information of the relay device, a next target DeNB to which the relay device is to be handed over, and notifies the next target DeNB to which the relay device needs to be handed over of the uplink physical information used for the relay device to access the source DeNB, when the preset trigger condition is satisfied, i.e., a preset time point is reached or a location is reached.

Step 702: The target DeNB detects the relay device according to the uplink physical information sent by the source DeNB, and configures resource information for the relay device when the relay device moves to the coverage of the target DeNB.

After obtaining the uplink physical information of the relay device, the target DeNB may demodulate and decode uplink signals of the relay device according to the uplink physical information, so that it can be detected whether the relay device moves to the coverage of the target DeNB. When detecting that the relay device moves to the coverage of the target DeNB, the target DeNB configures the resource information for the relay device so that the relay device uses the pre-configured resource information when the relay device is subsequently handed over from the source DeNB to the target DeNB. This prevents the service interruption that occurs because the target DeNB does not allocate the resource information until knowing that the relay device needs to be handed over.

Step 703: The relay device sends a measurement report to the source DeNB.

During moving of the relay device, a handover from the source DeNB to the target DeNB is needed due to signal changes. Therefore, the relay device needs to send the measurement report to the source DeNB.

Step 704: After making a handover decision, the source DeNB sends a handover request message to the target DeNB.

Step 705: The target DeNB sends a handover request acknowledge message to the source DeNB.

In step 702, the target DeNB has successfully configured the resource information for the relay device. Therefore, in step 705, after receiving the handover request message sent by the source DeNB, the target DeNB may directly feed back a handover request acknowledge message to the source DeNB without configuring the resource information again. The handover request acknowledge message may carry the resource information which has been configured for the relay device before the handover.

Step 706: After receiving the handover request acknowledge message, the source DeNB sends a handover command message to the relay device.

Step 707: After receiving the handover command message, the relay device sends a handover command message to the UE controlled by the relay device.

Step 708: The source DeNB releases resources, and the handover procedure ends.

In this embodiment, before the relay device initiates the handover, the source DeNB may send the uplink physical information of the relay device to the target DeNB according to the location information during moving of the relay device, or time information, so that the target DeNB may configure the resource information for the relay device before the relay device initiates the handover. Therefore, the target DeNB does not need to configure the resource information for the relay device again when the relay device initiates the handover from the source DeNB to the target DeNB, but quickly provides the pre-configured resource information for the relay device. In this way, the handover delay of the relay device during the handover process is reduced, the service continuity of the UE controlled by the relay device during the handover process is further ensured, and the QoS is improved.

Figure 8:
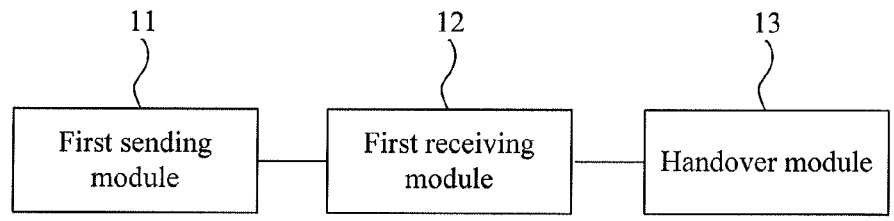
FIG. 8 is a schematic structural diagram of a relay device according to an embodiment of the present disclosure.

FIG. 8 is a schematic structural diagram of a relay device according to an embodiment of the present disclosure. As shown in FIG. 8, the relay device may include: a first sending module 11, a first receiving module 12, and a handover module 13. The first sending module 11 is configured to send, before a source DeNB makes a handover decision, auxiliary information for obtaining the pre-configured parameter. The first receiving module 12 is configured to receive the pre-configured parameter. The handover module 13 is configured to perform a handover from the source DeNB to the target DeNB according to the pre-configured parameter.

Figure 9:
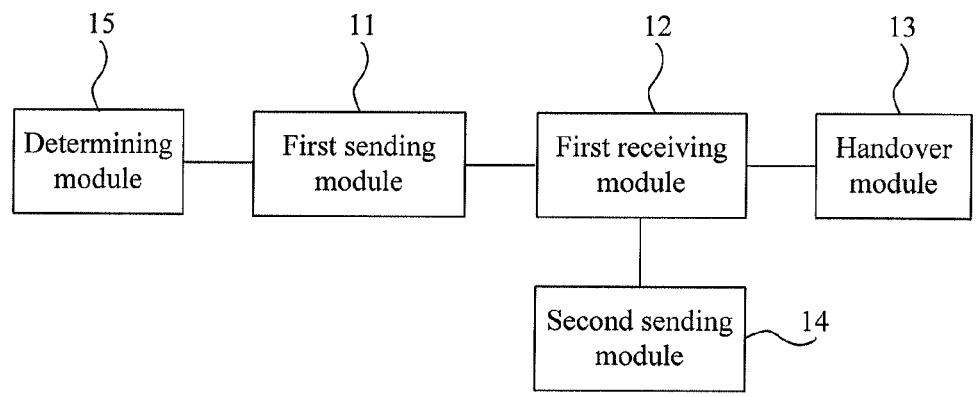
FIG. 9 is a schematic structural diagram of a relay device according to another embodiment of the present disclosure.

FIG. 9 is a schematic structural diagram of a relay device according to another embodiment of the present disclosure. As shown in FIG. 9, the relay device, based on the relay device illustrated in FIG. 8, may further include: a second sending module 14 and a determining module 15. The second sending module 14 is configured to send pre-configuration information to a UE so that the UE configures the parameter according to the pre-configuration information. The determining module 15 is configured to determine whether the distance between the relay device and the target DeNB is shorter than a preset distance, or whether a preset time point is reached, or whether a preset location is reached, before the source DeNB makes a handover decision.

The implementation principle of the relay device according to this embodiment is the same as that of the handover processing method illustrated in FIG. 1, which is not detailed here again.

According to this embodiment, before the source DeNB makes the handover decision, the relay device may pre-configure resources that are required for the handover of the relay device from the source DeNB to the target DeNB. In this case, before the handover from the source DeNB to the target DeNB needs to be executed, the relay device makes a good preparation for the handover; and during the handover, the relay device may be handed over from the source DeNB to the target DeNB according to the pre-configured resources, without the need of configuring the resources when the relay device is being handed over from the source DeNB to the target DeNB. In addition, the relay device may send the pre-configuration information to the UE before the source DeNB makes the handover decision so that the UE reconfigures the parameter before the handover of the relay device. This also prevents the service interruption of the UE during the handover of the relay device. Therefore, the handover processing relay device according to this embodiment shortens the handover delay of the relay device during the handover process, reduces the service interruption time of the UE controlled by the relay device, ensures the service continuity of the UE controlled by the relay device during the handover process, and improves the QoS. In addition, before the relay device is handed over from the source DeNB to the target DeNB, the source DeNB and the target DeNB may obtain the pre-configured parameter, so that the source DeNB and the target DeNB do not need to configure the resources again during the handover of the relay device. In this way, the service continuity is further ensured, and the QoS is improved.

Figure 10:
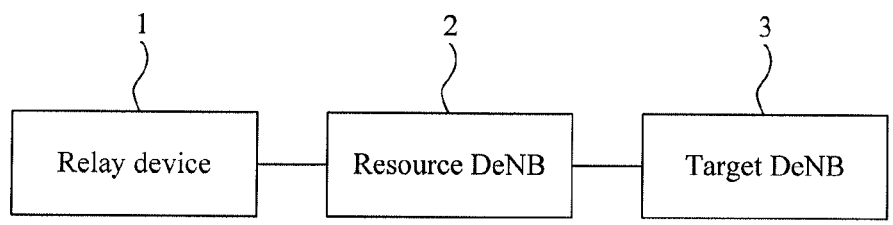
FIG. 10 is a schematic structural diagram of a handover processing system according to an embodiment of the present disclosure.

FIG. 10 is a schematic structural diagram of a handover processing system according to an embodiment of the present disclosure. As shown in FIG. 10, the system may include: a relay device 1, a source DeNB 2, and a target DeNB 3. The relay device 1 is configured to send auxiliary information for obtaining pre-configured parameter, receive the pre-configured parameter, and perform a handover from the source DeNB 2 to the target DeNB 3 according to the pre-configured parameter. The source DeNB 2 is configured to make a handover decision after the relay device obtains the pre-configured parameter. The target DeNB 3 is configured to receive a handover request of the relay device 1 after the source DeNB 2 makes the handover decision.

In the handover processing system according to another embodiment of the present disclosure, if a configured parameter set is saved in the O&M system of the relay device 1, the relay device 1 is configured to:

send a handover pre-configuration request carrying auxiliary information to the O&M system of the relay device, and receive the pre-configured parameter that is obtained from the configured parameter set according to the auxiliary information and sent by the O&M system of the relay device;

send a measurement report carrying the pre-configured parameter to the source DeNB 2;

receive a handover command preparation message sent by the source DeNB 2 and configure the pre-configured parameter according to the handover command preparation message; and after the source DeNB 2 receives a handover request acknowledge message fed back by the target DeNB 3, receive a handover command activation message sent by the source DeNB 2, activate the pre-configured parameter, and perform a handover from the source DeNB 2 to the target DeNB 3.

The implementation principle of the handover processing system according to this embodiment is the same as that of the handover processing method illustrated in FIG. 2, which is not detailed here again.

In the handover processing system according to still another embodiment of the present disclosure, if the configured parameter set is saved in the O&M system of the source DeNB 2, the relay device 1 is configured to:

send a measurement report or dedicated signaling message carrying auxiliary information to the source DeNB 2;

after the source DeNB 2 obtains the pre-configured parameter from the configured parameter set of the O&M system of the source DeNB 2 according to the auxiliary information, receive a handover command preparation message carrying the pre-configured parameter that is sent by the source DeNB 2; and after the source DeNB 2 sends a handover request message carrying the pre-configured parameter to the target DeNB 3 and receives a handover request acknowledge message fed back by the target DeNB 3, receive a handover command activation message sent by the source DeNB 2, activate the pre-configured parameter according to the handover command activation message, and perform a handover from the source DeNB 2 to the target DeNB 3.

The implementation principle of the handover processing system according to this embodiment is the same as that of the handover processing method illustrated in FIG. 3, which is not detailed here.

In the handover processing system according to still another embodiment of the present disclosure, if the configured parameter set is saved in the O&M system of the target DeNB 3, the relay device 1 is configured to:

send a measurement report or dedicated signaling message carrying auxiliary information to the source DeNB 2; and after the source DeNB 2 sends a handover request message carrying the auxiliary information to the target DeNB 3, and the target DeNB 3 obtains the pre-configured parameter from the configured parameter set of the O&M system of the target DeNB 3 according to the auxiliary information and sends a handover request acknowledge message carrying the pre-configured parameter to the source DeNB 2, receive a handover command message carrying the pre-configured parameter that is sent by the source DeNB 2, activate the pre-configured parameter according to the handover command activation message, and perform a handover from the source DeNB 2 to the target DeNB 3.

The implementation principle of the handover processing system according to this embodiment is the same as that of the handover processing method illustrated in FIG. 4, which is not detailed here again.

In the handover processing system according to still another embodiment of the present disclosure, if the configured parameter set is saved in the MME, the relay device 1 is configured to:

send a measurement report or dedicated signaling message carrying auxiliary information to the source DeNB 2;

after the source DeNB 2 sends a handover request message carrying the auxiliary information to the MME and the MME obtains the pre-configured parameter from the configured parameter set, sends a handover command message carrying the pre-configured parameter to the source DeNB 2, and sends a handover request message carrying the pre-configured parameter to the target DeNB 3, receive a handover command preparation message carrying the pre-configured parameter that is sent by the source DeNB 2; and after the target DeNB 3 receives the handover request message carrying the pre-configured parameter and sends a handover request acknowledge message to the MME, and the MME sends a handover command activation message to the source DeNB 2, receive a handover command activation message sent by the source DeNB 2, activate the pre-configured parameter according to the handover command activation message, and perform a handover from the source DeNB 2 to the target DeNB 3.

The implementation principle of the handover processing system according to this embodiment is the same as that of the handover processing method illustrated in FIG. 5, which is not detailed here again.

In the above system embodiment, before the source DeNB makes the handover decision, the relay device may pre-configure resources that are required for the handover of the relay device from the source DeNB to the target DeNB. In this case, before the handover from the source DeNB to the target DeNB needs to be executed, the relay device makes a good preparation for the handover; and during the handover, the relay device may be handed over from the source DeNB to the target DeNB according to the pre-configured resources, without the need of configuring the resources when the relay device is being handed over from the source DeNB to the target DeNB. In addition, before the source DeNB makes the handover decision, the relay device sends the pre-configuration information to the UE so that the UE configures the parameter before the handover of the relay device. This also prevents the service interruption of the UE during the handover of the relay device. Therefore, the handover processing system according to this embodiment shortens the handover delay of the relay device during the handover process, shortens the service interruption time of the UE controlled by the relay device, further ensures the service continuity of the UE controlled by the relay device during the handover process, and improves the QoS. In addition, before the relay device is handed over from the source DeNB to the target DeNB, the source DeNB and the target DeNB may obtain the pre-configured parameter, so that the source DeNB and the target DeNB do not need to configure the resources again during the handover of the relay device. In this way, the service continuity is further ensured, and the QoS is improved.

Figure 11:
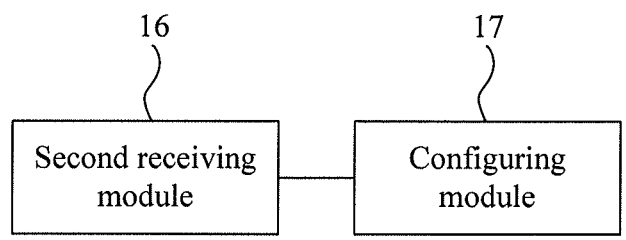
FIG. 11 is a schematic structural diagram of an base station according to an embodiment of the present disclosure.

FIG. 11 is a schematic structural diagram of an base station according to an embodiment of the present disclosure. As shown in FIG. 11, the base station of this embodiment may include: a second receiving module 16, and a configuring module 17. The second receiving module 16 is configured to receive uplink physical information of a relay device sent by a source DeNB; and the configuring module 17 is configured to configure resource information for the relay device when the relay device is detected according to the uplink physical information so that the source DeNB hands over the relay device to the target DeNB according to the resource information.

The implementation principle of the base station according to this embodiment is the same as that of the handover processing method illustrated in FIG. 6, which is not detailed here again.

According to this embodiment, after obtaining uplink physical information of the relay device, the base station may demodulate and decode uplink signals of the relay device according to the uplink physical information, so that it can be detected whether the relay device moves to the coverage of the target DeNB. When detecting that the relay device moves to the coverage of the target DeNB, the target DeNB configures the resource information for the relay device so that the relay device uses the pre-configured resource information when the relay device is subsequently handed over from the source DeNB to the target DeNB. This prevents the service interruption of the UE that occurs because the target DeNB does not allocate the resource information for the relay device until knowing that the relay device needs to be handed over. Therefore, according to this embodiment, the handover delay of the relay device during the handover process is shortened, the service continuity is ensured, and the QoS is improved.

The handover processing system according to another embodiment of the present disclosure may include: a relay device, a source DeNB, and a target DeNB. The source DeNB is configured to send uplink physical information of the relay device to the target DeNB according to route track information during moving of the relay device, or time information; and the target DeNB is configured to configure resource information for the relay device when the relay device is detected according to the uplink physical information so that the source DeNB hands over the relay device to the target DeNB according to the resource information.

In the handover processing system according to still another embodiment of the present disclosure, the source DeNB is further configured to: receive a measurement report sent by the relay device, and send a handover request message to the target DeNB; and after the target DeNB sends a handover request acknowledge message carrying the resource information to the source DeNB, send a handover command message carrying the resource information to the relay device and hand over the relay device to the target DeNB.

The implementation principle of the handover processing system according to the above two embodiments is the same as that of the handover processing method illustrated in FIG. 7, which is not detailed here again.

In the handover processing system according to the above two embodiments, before the relay device initiates the handover, the source DeNB may send the uplink physical information of the relay device to the target DeNB according to the location information of the moving relay device, or time information, so that the target DeNB may configure the resource information for the relay device before the relay device initiates the handover. Therefore, the target DeNB does not need to configure the resource information again when the relay device initiates the handover from the source DeNB to the target DeNB, but quickly provides the pre-configured resource information for the relay device. In this way, the handover delay of the relay device during the handover process is reduced, the service continuity of the UE controlled by the relay device during the handover process is further ensured, and the QoS is improved.

It is understandable to persons skilled in the art that all or part of the steps of the methods in the above embodiments may be implemented by hardware following instructions of programs. The programs may be stored in a computer readable storage medium. The storage medium may be a read only memory, a magnetic disk, or a CD-ROM.

It should be noted that the above embodiments are used to describe the technical solution of the present disclosure without imposing any limitation on the technical solution. Although the present disclosure is described in detail by referring to the exemplary embodiments, persons skilled in the art should understand that various modifications or equivalent replacements may be made to the technical solution of the present disclosure without departing from the principle and scope of the present disclosure.

It should be noted that the units described in the above UE and base station embodiments are divided only according to the function logic but are not limited to such division. Units that can implement corresponding functions are also applicable. In addition, names of the functional units are for differentiation only and are not intended to limit the protection scope of the present disclosure. Persons skilled in the art should understand that all or part of the steps of the preceding method embodiments can be implemented by hardware following instructions of programs. The programs may be stored in a computer readable storage medium. The storage medium may be a ready only memory, a magnetic disk, or a CD-ROM.

In conclusion, the above are merely exemplary embodiments of the present disclosure, and the protection scope of the present disclosure is not limited thereto. Variations or replacements readily apparent to persons skilled in the art within the technical scope disclosed by the present disclosure should fall within the protection scope of the present disclosure. Therefore, the protection scope of the present disclosure is subject to the appended claims.

What is claimed is:

1. A relay device for a group handover together with one or more user equipment (UE) processing method, comprising:
   pre-configuring a relay device in order that the relay device is handed over in a group handover mode together with one or more user equipment (UE) from a source donor E-UTran Node B (source DeNB) to a target Donor E-UTRAN Node B (target DeNB),
   wherein prior to the source DeNB making a handover decision to handover the relay device in a group handover mode together with one or more user equipment (UE) to the target DeNB, the relay device is already in communication to and is in control of the one or more user equipment (UE),
   wherein the pre-configuring of the relay device for the group handover processing method, comprising the relay device performing:
      directly sending auxiliary information pertaining to the relay device for performing the group handover mode to an operation and maintenance system (OMS) of the relay device in order to obtain a first pre-configured parameter associated with the target DeNB, wherein the first pre-configured parameter comprise at least one of: target cell frequency information, target cell bandwidth information, physical cell identity (PCI) information of a target cell, multicast broadcast single frequency network (MBSFN) subframe configuration information of the target cell, a tracking area identifier (TAI), and public land mobile network (PLMN) identifier information;
      receiving the first pre-configured parameter from the OMS of the relay device, wherein the first pre-configured parameter facilitates configuring of the relay device to perform a subsequent handover in the group handover mode together with the one or more UE to the target DeNB which takes place after the source DeNB making the handover decision;
   wherein the subsequent handover of the relay device in the group handover mode together with the one or more UE, comprising:
      sending by the relay device, a measurement report of the relay device to the source DeNB to initiate the source DeNB to handover the relay device in the group handover mode together with the one or more UE to the target DeNB; and
      performing by the source DeNB, the handover of the the relay device in the group handover mode together with the one or more UE from the source DeNB to the target DeNB;
   wherein the source DeNB in response to receiving the first preconfigured parameter carried in the measurement report, the source DeNB performing the following:
      sending a handover request message carrying the first pre-configured parameter to the target DeNB,
      sending a handover command preparation message to the relay device,
      receiving a handover request acknowledge message from the target DeNB, sending a handover command activation message to the relay device; and
   wherein the relay device in response to receiving the handover command activation message from the source DeNB, the relay device performing the following:
      configuring the relay device to operate using the first pre-configured parameter prior to the relay device is handover by the source DeNB to the target DeNB.

2. The relay device for a group handover together with one or more user equipment (UE) processing method according to claim 1, wherein after receiving the first pre-configured parameter, the method further comprises:
   sending by the relay device, pre-configuration information to the one or more UE which are in communication to and in control by the relay device, wherein the pre-configuration information facilitates the hand over of the one or more UE from the source DeNB to the target DeNB.

3. The relay device for a group handover together with one or more user equipment (UE) processing method according to claim 1, wherein the auxiliary information pertaining to the relay device comprises:
   at least one of: current location information, current speed information, current time point information, current frequency information, physical cell identity (PCI) information, and history record information.

4. The relay device for a group handover together with one or more user equipment (UE) processing method according to claim 3, wherein prior to the relay device sending the auxiliary information to obtain the first pre-configured parameter, the method further comprises:
   determining by the relay device, whether any of the following conditions are met by the relay device:
      a distance from the target Donor E-UTRAN Node B is shorter than a preset distance,
      a preset time point is reached, and
      a preset location is reached.

5. The relay device for a group handover together with one or more user equipment (UE) processing method according to claim 1, wherein the directly sending the auxiliary information pertaining to the relay device to the OMS to obtain the first pre-configured parameter, comprises:
   directly sending by the relay device, the handover pre-configuration request carrying the auxiliary information pertaining to the relay device to the OMS of the relay device;
   wherein the receiving by the relay device, the obtained first pre-configured parameter, comprises:
      receiving by the relay device, the first pre-configured parameter sent by the OMS, wherein the first pre-configured parameter is obtained from a configured parameter set according to the auxiliary information pertaining to the relay device;

wherein the sending of the measurement report of the relay device to initiate the handover of the relay device from the source DeNB to the target DeNB, comprises: sending by the relay device, the measurement report carrying the first pre-configured parameter to the source DeNB.

6. A relay device for a group handover together with one or more user equipment (UE) processing method, comprising:

pre-configuring a relay device in order that the relay device is handed over in a group handover mode together with one or more user equipment (UE) from a source donor E-UTran Node B (source DeNB) to a target Donor E-UTRAN Node B (target DeNB), wherein prior to the source DeNB making a handover decision to handover the relay device in a group handover mode together with one or more user equipment (UE) to the target DeNB, the relay device is already in communication to and is in control of the one or more user equipment (UE), wherein the pre-configuring of the relay device for the group handover processing method, comprising the relay device performing:

directly sending by the relay device, a measurement report or dedicated signaling message carrying the auxiliary information pertaining to the relay device for performing the group handover mode to the source DeNB in order to obtain a pre-configured parameter, wherein the pre-configured parameter comprise at least one of: target cell frequency information, target cell bandwidth information, physical cell identity (PCI) information of a target cell, multicast broadcast single frequency network (MBSFN) subframe configuration information of the target cell, a tracking area identifier (TAI), and public land mobile network (PLMN) identifier information;

receiving by the relay device, a handover command preparation message carrying the pre-configured parameter that is sent by the source DeNB, wherein the pre-configured parameter is obtained by the source DeNB directly from a configured parameter set of an operation and maintenance system of the source DeNB according to the auxiliary information priorly received by the source DeNB;

wherein after the source DeNB making the handover decision, the performing by the source DeNB the handover of the relay device in the group handover mode together with the one or more UE from the source DeNB to the target DeNB according to the pre-configured parameter, comprises:

receiving by the relay device, a handover command activation message sent by the source DeNB to facilitate the handover of the relay device in the group handover mode together with the one or more UE, wherein the handover command activation message is sent by the source DeNB after the source DeNB sends a handover request message carrying the pre-configured parameter to the target DeNB and receives a handover request acknowledge message from the target DeNB; and the relay device in response to receiving the handover command activation message from the source DeNB, configuring the relay device to enable the source DeNB to perform the handover of the relay device in the group handover mode together with the one or more UE from the source DeNB to the target DeNB;

wherein the source DeNB in response to receiving the preconfigured parameter carried in the measurement report, the source DeNB performing the following:

sending a handover request message carrying the pre-configured parameter to the target DeNB, sending a handover command preparation message to the relay device, receiving a handover request acknowledge message from the target DeNB, sending a handover command activation message to the relay device; and wherein the relay device in response to receiving the handover command activation message from the source DeNB, the relay device performing the following:

configuring the relay device to operate using the pre-configured parameter prior to the relay device is handover by the source DeNB to the target DeNB.

7. A relay device for a group handover together with one or more user equipment (UE) processing method, comprising:

pre-configuring a relay device in order that the relay device is handed over in a group handover mode together with one or more user equipment (UE) from a source donor E-UTran Node B (source DeNB) to a target Donor E-UTRAN Node B (target DeNB), wherein prior to the source DeNB making a handover decision to handover the relay device in a group handover mode together with one or more user equipment (UE) to the target DeNB, the relay device is already in communication to and is in control of the one or more user equipment (UE), wherein the pre-configuring of the relay device for the group handover processing method, comprising the relay device performing:

directly sending a measurement report or a dedicated signaling message carrying the auxiliary information pertaining to the relay device for performing the group handover mode to the source DeNB in order that the source DeNB sends a handover request message carrying the auxiliary information to the target DeNB;

receiving by the relay device, a handover command message carrying a pre-configured parameter that is sent by the source DeNB, wherein the pre-configured parameter comprise at least one of: target cell frequency information, target cell bandwidth information, physical cell identity (PCI) information of a target cell, multicast broadcast single frequency network (MBSFN) subframe configuration information of the target cell, a tracking area identifier (TAI), and public land mobile network (PLMN) identifier information, and wherein the pre-configured parameter is obtained by the target DeNB directly from a configured parameter set of an operation and maintenance system of the target DeNB according to the auxiliary information priorly sent by the source DeNB to the target DeNB;

wherein after the source DeNB making the handover decision, the performing by the source DeNB the handover of the relay device in the group handover mode together with the one or more UE from the source DeNB to the target DeNB according to the pre-configured parameter, comprises:
configuring the relay device to use the pre-configured parameter to facilitate the source DeNB to handover the relay device in the group handover mode together with the one or more UE from the source DeNB to the target DeNB;
wherein the source DeNB in response to receiving the preconfigured parameter carried in the measurement report, the source DeNB performing the following:
sending a handover request message carrying the pre-configured parameter to the target DeNB,
sending a handover command preparation message to the relay device,
receiving a handover request acknowledge message from the target DeNB, sending a handover command activation message to the relay device; and
wherein the relay device in response to receiving the handover command activation message from the source DeNB, the relay device performing the following:
configuring the relay device to operate using the pre-configured parameter prior to the relay device is handover by the source DeNB to the target DeNB.

8. A relay device for a group handover together with one or more user equipment (UE) processing method, comprising:
pre-configuring a relay device in order that the relay device is handed over in a group handover mode together with one or more user equipment (UE) from a source donor E-UTran Node B (source DeNB) to a target Donor E-UTRAN Node B (target DeNB),
wherein prior to the source DeNB making a handover decision to handover the relay device in a group handover mode together with one or more user equipment (UE) to the target DeNB, the relay device is already in communication to and is in control of the one or more user equipment (UE),
wherein the pre-configuring of the relay device for the group handover processing method, comprising the relay device performing:
directly sending the measurement report or dedicated signaling message carrying the auxiliary information pertaining to the relay device for performing the group handover mode to the source DeNB;
the source DeNB sending a handover required message carrying the pre-configured information to a mobility management entity (MME) to enable the MME to obtain a pre-configured parameter from a configured parameter set according to the auxiliary information, wherein the pre-configured parameter comprise at least one of: target cell frequency information, target cell bandwidth information, physical cell identity (PCI) information of a target cell, multicast broadcast single frequency network (MBSFN) subframe configuration information of the target cell, a tracking area identifier (TAI), and public land mobile network (PLMN) identifier information;
sending by the MME, a handover command message to the source DeNB;
receiving by the relay device, a handover command preparation message carrying the pre-configured parameter from the source DeNB;
wherein the performing by the source DeNB the handover from the source DeNB to the target DeNB according to the pre-configured parameter, comprises:
receiving by the relay device, a handover command activation message sent by the source Donor E-UTRAN Node B; and
configuring the relay device to use the pre-configured parameter according to the handover command activation message to enable the source DeNB to perform the handover of the relay device in the group handover mode together with the one or more UE from the source DeNB to the target DeNB;
wherein the source DeNB in response to receiving the preconfigured parameter carried in the measurement report, the source DeNB performing the following:
sending a handover request message carrying the pre-configured parameter to the target DeNB,
sending a handover command preparation message to the relay device,
receiving a handover request acknowledge message from the target DeNB, sending a handover command activation message to the relay device; and
wherein the relay device in response to receiving the handover command activation message from the source DeNB, the relay device performing the following:
configuring the relay device to operate using the pre-configured parameter prior to the relay device is handover by the source DeNB to the target DeNB.

9. A relay device for a group handover together with one or more user equipment (UE) processing method, comprising:
receiving by a target Donor E-UTRAN Node B (target DeNB), uplink physical information of a relay device sent by a source Donor E-UTRAN Node B (source DeNB), wherein the relay device is in already communication to and is in control of the one or more user equipment (UE) which are to be handed over in a group handover mode together with the relay device; and
configuring by the target DeNB, resource information for the relay device after the relay device has been detected according to the uplink physical information, such that the relay device is being handover in the group handover mode together with the one or more UE by the source DeNB to the target DeNB according to the resource information, wherein the relay device has priorly received pre-configured parameters associated with the target DeNB for performing the group handover mode from an operation and maintenance system (OMS) of the relay device for configuring the relay device to be handover in the group handover mode together with the one or more UE to the target DeNB by the source DeNB, wherein the pre-configured parameter comprise at least one of: target cell frequency information, target cell bandwidth information, physical cell identity (PCI) information of a target cell, multicast broadcast single frequency network (MBSFN) subframe configuration information of the target cell, a tracking area identifier (TAI), and public land mobile network (PLMN) identifier information;
wherein the source DeNB in response to receiving the preconfigured parameter carried in the measurement report, the source DeNB performing the following:
sending a handover request message carrying the pre-configured parameter to the target DeNB,
sending a handover command preparation message to the relay device, receiving a handover request acknowledge message from the target DeNB, sending a handover command activation message to the relay device; and wherein the relay device in response to receiving the handover command activation message from the source DeNB, the relay device performing the following:

configuring the relay device to operate using the pre-configured parameter prior to the relay device is handover by the source DeNB to the target DeNB.

10. The relay device for a group handover together with one or more user equipment (UE) processing method according to claim 9, wherein the receiving the uplink physical information of the relay device from the source DeNB comprises:

receiving by the target DeNB, the uplink physical information from the source DeNB when the relay device reaches a location along a route track or when a preset time point is reached.

11. The relay device for a group handover together with one or more user equipment (UE) processing method according to claim 9, further comprising:

sending by the relay device, a handover command message to a user equipment controlled by the relay device, and handing over the one or more user equipment from the source DeNB to the target DeNB.

12. A relay device for a group handover with one or more user equipment (UE), comprising:

executable program instructions stored within a memory, wherein the executed program instructions cause the relay device to facilitate a handover in the group handover mode together with the one or more UE by a source Donor E-UTRAN Node B (source DeNB) to a target Donor E-UTRAN Node B (target DeNB), and the relay device is configured to:

preconfigure for a handover of the relay device in the group handover mode together with the one or more UE to take place from a source DeNB to a target DeNB, wherein prior to the source DeNB making a handover decision to handover the relay device to the target DeNB, the relay device is already in communication to and is in control of the one or more user equipment (UE);

wherein the pre-configuring of the relay device for the group handover processing method, comprising the relay device performing:

directly send auxiliary information pertaining to the relay device for performing the group handover mode to an operation and maintenance system (OMS) of the relay device to directly obtain a pre-configured parameter, wherein the pre-configured parameter comprise at least one of: target cell frequency information, target cell bandwidth information, physical cell identity (PCI) information of a target cell, multicast broadcast single frequency network (MBSFN) subframe configuration information of the target cell, a tracking area identifier (TAI), and public land mobile network (PLMN) identifier information;

receive the pre-configured parameter from the OMS of the relay device, wherein:

after the source DeNB making the handover decision, the first pre-configured parameter facilitates configuring the relay device to be handover in the group handover mode together with the one or more UE to the target DeNB by the source DeNB, and send a measurement report of the relay device to the source DeNB to initiate the source DeNB to handover the relay device in the group handover mode together with the one or more UE to the target DeNB; and cause the relay device to be handover in the group handover mode together with the one or more UE by the source DeNB from the source DeNB to the target DeNB according to the received pre-configured parameter;

wherein the source DeNB in response to receiving the preconfigured parameter carried in the measurement report, the source DeNB performing the following:

sending a handover request message carrying the pre-configured parameter to the target DeNB, sending a handover command preparation message to the relay device, receiving a handover request acknowledge message from the target DeNB, sending a handover command activation message to the relay device; and wherein the relay device in response to receiving the handover command activation message from the source DeNB, the relay device performing the following:

configuring the relay device to operate using the pre-configured parameter prior to the relay device is handover by the source DeNB to the target DeNB.

13. The relay device for a group handover with one or more user equipment (UE) according to claim 12, further configured to:

send pre-configuration information to the one or more user equipment according to the pre-configured parameter in order to configure the one or more user equipment according to the pre-configuration information.

14. The relay device for a group handover with one or more user equipment (UE) according to claim 12, further configured to:

determine whether one or more of the conditions is met by the relay device: whether a distance from the target DeNB is shorter than a preset distance, whether a preset time point is reached, and whether a preset location is reached.

15. A relay device for a group handover together with one or more user equipment (UE) processing system, comprising a relay device, a source Donor E-UTRAN Node B (source DeNB), and a target Donor E-UTRAN Node B (target DeNB), wherein the relay device is already in communication to and is in control of the one or more user equipment (UE) which are to be handed over along with the relay device in a group handover mode, wherein the relay device:

directly sends auxiliary information pertaining to the relay device for performing the group handover mode to an operation and maintenance system (OMS) of the relay device in order to obtain a first pre-configured parameter associated with the target DeNB, wherein the first pre-configured parameter comprise at least one of: target cell frequency information, target cell bandwidth information, physical cell identity (PCI) information of a target cell, multicast broadcast single frequency network (MBSFN) subframe configuration information of the target cell, a tracking area identifier (TAI), and public land mobile network (PLMN) identifier information;

receives the first pre-configured parameter from the OMS wherein the first pre-configured parameter facilitates configuring of the relay device to perform a subsequent handover in the group handover mode together with the one or more UE to the target DeNB which takes place after the source DeNB making a handover decision, sends a measurement report carrying the first pre-configured parameter to the source DeNB to initiate the source DeNB to handover the relay device in the group handover mode together with the one or more UE to the target DeNB, and wherein the source DeNB:

makes the handover decision after the relay device obtains the first pre-configured parameter; and performs a handover on the relay device in the group handover mode together with the one or more UE from the source DeNB to the target DeNB according to the first pre-configured parameter;

wherein the source DeNB in response to receiving the first preconfigured parameter carried in the measurement report, the source DeNB performing the following:

sending a handover request message carrying the first pre-configured parameter to the target DeNB, sending a handover command preparation message to the relay device, receiving a handover request acknowledge message from the target DeNB, sending a handover command activation message to the relay device; and wherein the relay device in response to receiving the handover command activation message from the source DeNB, the relay device performing the following:

configuring the relay device to operate using the first pre-configured parameter prior to the relay device is handover by the source DeNB to the target DeNB.

16. The relay device for a group handover together with one or more user equipment (UE) processing system according to claim 15, wherein the relay device:

receives a handover command preparation message from the source DeNB and configures the first pre-configured parameter according to the handover command preparation message; and receives a handover command activation from the source DeNB after the source DeNB receives a handover request acknowledge message from the target DeNB, activate the pre-configured parameter, and causes the source DeNB to perform a relay device handover from the source DeNB to the target DeNB.

17. A relay device for a group handover together with one or more user equipment (UE) processing system, comprising a relay device, a source Donor E-UTRAN Node B (source DeNB), and a target Donor E-UTRAN Node B (target DeNB), wherein the relay device which is already in communication to and is in control of the one or more user equipment (UE), is to be handed over in a group handover mode together with the one or more UE, wherein the relay device:

sends a measurement report or dedicated signaling message carrying the auxiliary information pertaining to the relay device for performing the group handover mode to the source DeNB in order to obtain a pre-configured parameter, wherein the pre-configured parameter comprise at least one of: target cell frequency information, target cell bandwidth information, physical cell identity (PCI) information of a target cell, multicast broadcast single frequency network (MB-SFN) subframe configuration information of the target cell, a tracking area identifier (TAI), and public land mobile network (PLMN) identifier information, and wherein in response, the source DeNB directly obtains the pre-configured parameter from a configured parameter set of an operation and maintenance system of the source DeNB according to the auxiliary information priorly received by the source DeNB, and the source DeNB communicates a handover command preparation message carrying the pre-configured parameter to the relay device, wherein the source DeNB sends a handover request message to the target DeNB and the source DeNB receives a handover request acknowledge message from the target DeNB;

receives the handover command preparation message;

receives a handover command activation message from the source DeNB after the source DeNB receives the handover request acknowledge from the target DeNB;

activates the pre-configured parameter according to the handover command activation message, and the pre-configured parameter causes the source DeNB to perform a handover of the relay device in the group handover mode together with the one or more UE from the source DeNB to the target DeNB;

wherein the source DeNB in response to receiving the preconfigured parameter carried in the measurement report, the source DeNB performing the following:

sending a handover request message carrying the first pre-configured parameter to the target DeNB, sending a handover command preparation message to the relay device, receiving a handover request acknowledge message from the target DeNB, sending a handover command activation message to the relay device; and wherein the relay device in response to receiving the handover command activation message from the source DeNB, the relay device performing the following:

configuring the relay device to operate using the pre-configured parameter prior to the relay device is handover by the source DeNB to the target DeNB.

18. A relay device for a group handover together with one or more user equipment (UE) processing system, comprising a relay device, a source Donor E-UTRAN Node B (source DeNB), and a target Donor E-UTRAN Node B (target DeNB), wherein the relay device which is already in communication to and is in control of the one or more user equipment (UE), is to be handed over in a group handover mode together with the one or more UE, wherein the relay device:

directly sends a measurement report or dedicated signaling message carrying auxiliary information pertaining to the relay device for performing the group handover mode to the source DeNB, wherein in response to receiving the measurement report, the source DeNB sends a handover request message carrying the auxiliary information to the target DeNB, the target DeNB directly obtains a pre-configured parameter from a configured parameter set of an operation and maintenance system of the target DeNB according to the auxiliary information, wherein the pre-configured parameter comprise at least one of: target cell frequency information, target cell bandwidth information, physical cell identity (PCI) information of a target cell, multicast broadcast single frequency network (MBSFN) subframe configuration information of the target cell, a tracking area identifier (TAI), and public land mobile network (PLMN) identifier information, and the target DeNB sends a handover request acknowledge message carrying the pre-configured parameter to the source DeNB, and the source DeNB sends a handover command message carrying the pre-configured parameter to the relay device, wherein the relay device:
receives the handover command message from the source DeNB,
activates the pre-configured parameter, and
causes the source DeNB to perform a handover of the relay device in the group handover mode together with the one or more UE from the source DeNB to the target DeNB;
wherein the source DeNB in response to receiving the preconfigured parameter carried in the measurement report, the source DeNB performing the following:
sending a handover request message carrying the pre-configured parameter to the target DeNB,
sending a handover command preparation message to the relay device,
receiving a handover request acknowledge message from the target DeNB, sending a handover command activation message to the relay device; and
wherein the relay device in response to receiving the handover command activation message from the source DeNB, the relay device performing the following:
configuring the relay device to operate using the pre-configured parameter prior to the relay device is handover by the source DeNB to the target DeNB.

19. A relay device for a group handover together with one or more user equipment (UE) processing system, comprising a relay device, a source Donor E-UTRAN Node B (source DeNB), and a target Donor E-UTRAN Node B (target DeNB), wherein the relay device is already in communication to and is in control of the one or more user equipment (UE) which are to be handed over together with the relay device in a group handover mode, wherein the relay device:
sends a measurement report or dedicated signaling message carrying auxiliary information pertaining to the relay device for performing the group handover mode to the source DeNB, wherein the source DeNB subsequently communicates a handover required message carrying pre-configured information to a mobility management entity (MME), wherein the MME:
obtains a pre-configured parameter from a configured parameter set according to the auxiliary information, wherein the pre-configured parameter comprise at least one of: target cell frequency information, target cell bandwidth information, physical cell identity (PCI) information of a target cell, multicast broadcast single frequency network (MBSFN) subframe configuration information of the target cell, a tracking area identifier (TAI), and public land mobile network (PLMN) identifier information;
communicates a handover command message that includes the pre-configured parameter to the source DeNB, and the source DeNB communicates a handover command preparation message that includes the pre-configured parameter to the relay device;
sends a handover request message carrying the pre-configured parameter to the target DeNB, wherein the target DeNB subsequently sends a handover request acknowledge message to the MME, and the MME sends a handover command activation message to the source DeNB;
wherein the relay device:
receives a handover command preparation message carrying the pre-configured parameter from the source DeNB;
receives the handover command activation message from the source DeNB,
activates the pre-configured parameter according to the handover command activation message, and
causes the source DeNB to perform a handover of the relay device in the group handover mode together with the one or more UE from the source DeNB to the target DeNB;
wherein the source DeNB in response to receiving the preconfigured parameter carried in the measurement report, the source DeNB performing the following:
sending a handover request message carrying the pre-configured parameter to the target DeNB,
sending a handover command preparation message to the relay device,
receiving a handover request acknowledge message from the target DeNB, sending a handover command activation message to the relay device; and
wherein the relay device in response to receiving the handover command activation message from the source DeNB, the relay device performing the following:
configuring the relay device to operate using the pre-configured parameter prior to the relay device is handover by the source DeNB to the target DeNB.

20. A target Donor E-UTRAN Node B (DeNB) base station, which comprises at least a processing hardware executing program codes stored in a memory, which configured the target DeNB to perform a group handover in the group handover mode together with one or more user equipment (UE), the target DeNB is configured to:
receive uplink physical information of a relay device from a source DeNB; and
configure resource information for the relay device after the relay device has been detected according to the uplink physical information, such that the relay device is being handover in the group handover mode together with the one or more UE by the source DeNB to the target DeNB base station according to the resource information, wherein the relay device has been priorly pre-configured with parameters associated with the target DeNB base station, wherein the pre-configured parameter comprise at least one of: target cell frequency information, target cell bandwidth information, physical cell identity (PCI) information of a target cell, multicast broadcast single frequency network (MBSFN) subframe configuration information of the target cell, a tracking area identifier (TAI), and public land mobile network (PLMN) identifier information, and the pre-configured parameters are obtained by the relay device from an operation and maintenance system (OMS) of the relay device to configure the relay device to be handover in the group handover mode together with the one or more UE to the target DeNB base station by the source DeNB;
wherein the source DeNB in response to receiving the preconfigured parameter carried in the measurement report, the source DeNB performing the following:
sending a handover request message carrying the pre-configured parameter to the target DeNB,
sending a handover command preparation message to the relay device,
receiving a handover request acknowledge message from the target DeNB, sending a handover command activation message to the relay device; and wherein the relay device in response to receiving the handover command activation message from the source DeNB, the relay device performing the following:

configuring the relay device to operate using the preconfigured parameter prior to the relay device is handover by the source DeNB to the target DeNB.

21. A relay device for a group handover in a group handover mode together with one or more user equipment (UE) processing system, comprising a relay device, a source DeNB, and a target DeNB, wherein the system comprises:

the source DeNB sends uplink physical information of the relay device for performing the group handover mode to the target DeNB when the relay reaches a location along a route track or when a preset time point is reached; and the target DeNB configures resource information for the relay device when the relay device is detected according to the uplink physical information, such that the source DeNB hands over the relay device in the group handover mode together with the one or more UE to the target DeNB according to the resource information, wherein the relay device has priorly received pre-configured parameters associated with the target DeNB from an operation and maintenance system (OMS) of the relay device for configuring the relay device to be handover in the group handover mode together with the one or more UE to the target DeNB by the source DeNB, wherein the pre-configured parameter comprise at least one of: target cell frequency information, target cell bandwidth information, physical cell identity (PCI) information of a target cell, multicast broadcast single frequency network (MBSFN) subframe configuration information of the target cell, a tracking area identifier (TAI), and public land mobile network (PLMN) identifier information;

wherein the source DeNB in response to receiving the preconfigured parameter carried in the measurement report, the source DeNB performing the following:

sending a handover request message carrying the preconfigured parameter to the target DeNB, sending a handover command preparation message to the relay device, receiving a handover request acknowledge message from the target DeNB, sending a handover command activation message to the relay device; and wherein the relay device in response to receiving the handover command activation message from the source DeNB, the relay device performing the following:

configuring the relay device to operate using the preconfigured parameter prior to the relay device is handover by the source DeNB to the target DeNB.

22. The relay device for a group handover together with one or more user equipment (UE) processing system according to claim 21, wherein the source DeNB:

receives a measurement report sent by the relay device, and sends a handover request message to the target DeNB; and the source DeNB sends a handover command preparation message carrying the resource information to the relay device to configure the pre-configured parameters in the relay device to prepare for being handover by the source DeNB to the target DeNB.

* * * * *